United States Patent Office 3,025,722
Patented Mar. 20, 1962

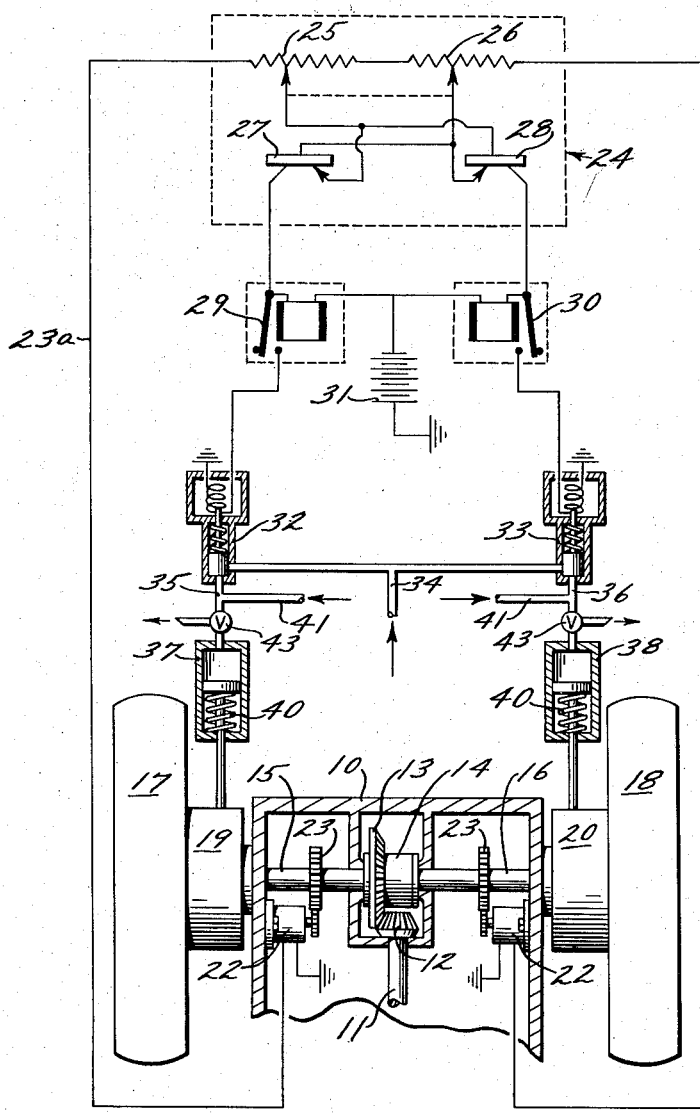
March 20, 1962 G. W. EGER, JR., ET AL 3,025,722
WHEEL SLIP CONTROL FOR WHEEL-TYPE TRACTORS
Filed Sept. 25, 1959
INVENTORS
GEORGE W. EGER JR.
PHILIP J. COSTA
BY
*Fryer and Johnson*
ATTORNEYS

3,025,722
WHEEL SLIP CONTROL FOR WHEEL-TYPE TRACTORS
George W. Eger, Jr., and Philip J. Costa, Peoria, Ill., assignors to Caterpillar Tractor Co., Peoria, Ill., a corporation of California
Filed Sept. 25, 1959, Ser. No. 842,448
3 Claims. (Cl. 74—711)

This invention relates to means for controlling the brakes on the drive wheels of a tractor or other vehicle to prevent slipping or free turning of one of the drive wheels from loss of traction which occurs, for example, when it is in loose or wet earth, thus permitting the other drive wheel to come to rest and preventing forward motion of the vehicle.

Mechanical differential means are commonly used between a pair of drive wheels on a vehicle in order that they may rotate at different speeds as is desirable when the vehicle is turning and the distance traveled by one wheel is necessarily greater than that of the other. When such a vehicle is operated under unfavorable traction conditions, one wheel may lose traction and spin at such a speed that the other remains stationary regardless of whether or not it is on solid ground under good traction conditions. Some vehicles are equipped with manually operated brake controls which enable the operator to apply a brake selectively to one or the other of the drive wheels and by applying the brakes to a slipping wheel, its speed may be reduced to the point where the opposite wheel having good traction is compelled to drive the vehicle. This solution of the slipping problem requires attention of the operator and it is difficult to control the degree to which the brake on the slipping wheel should be applied in order to effect traction without causing the vehicle to stall. Mechanical devices have also been provided in association with gear type differentials which place a limit upon the difference in speed of the two wheels but these devices are subject to a high rate of wear and also cause excessive tire wear due to the fact that they do not permit the proper differential action to accommodate the requirements which are met when the vehicle is making an extremely sharp turn.

It is the object of the present invention to provide automatic control means for applying the brake on either one of a pair of drive wheels of a vehicle when it exceeds the speed of the other wheel more than a predetermined amount automatically and through a speed sensing device.

Further and more specific objects and advantages of the invention are made apparent in the following specification wherein the invention is described in detail by reference to the accompanying drawing.

The drawing is a schematic view of the drive wheels of a vehicle, their brake actuating cylinders and an electric circuit which controls the direction of fluid under pressure to these cylinders in accordance with the present invention.

The drawing illustrates the drive wheels of a tractor but the invention is applicable to other types of vehicles as will readily appear from an understanding of the following specification.

A portion of a tractor final drive housing is illustrated at 10 and a shaft 11 which is driven by the tractor engine not shown imparts power through a pinion gear 12 and a bevel gear 13 to a conventional differential which is enclosed in a housing 14. The differential transmits this power to axles 15 and 16 upon which are mounted drive wheels 17 and 18, respectively. The drive wheels are provided with brakes 19 and 20 of any conventional type adapted to be actuated by fluid pressure. Because of the well known action of the differential 14, either one of the drive wheels may rotate at a speed greater than the other and, if either one is raised from contact with the ground or for any other reason permitted to spin freely as occurs on a slippery surface, it may absorb all of the torque from the drive shaft 11 while the other wheel remains at rest. It is a common occurrence, therefore, for a vehicle to remain motionless even though one of its wheels is on firm ground and it is well known that to apply the brakes, or particularly the brake on the spinning wheel, will reduce its speed and thereby effect transmission of a portion of the torque to the opposite wheel through the differential mechanism. The present invention accomplishes this automatically without in any way interfering with the normal differential action.

In order to sense the speed of the wheels and to detect excessive speeds, a pair of tachometer generators shown at 22 are employed and are driven by gear trains 23 which connect each of the generators to one of the axles 15 and 16. The generators are grounded to the vehicle body and are connected, as by wires 23a, with a differential voltage detector generally indicated at 24 in which are disposed a pair of potentiometers 25 and 26. These potentiometers are connected with transistors 27 and 28 respectively and, when the wheels 17 and 18 are rotating at the same speed, the current applied to each potentiometer is equal to that of the other so that they are electrically balanced and there is no effect upon the transistors.

When either drive wheel of the vehicle encounters poor traction and spins at an excessive speed, exceeding the speed of the other wheel by a predetermined value, the tachometer generator 22 driven by the axle of that wheel has a higher voltage output which, upon being received in the detector 24, produces a positive polarity in the potentiometer 25 or 26 with which the spinning wheel is associated. This positive polarity is transmitted through the corresponding transistor 27 or 28 to close either one of a pair of relay switches 29 or 30. Since at this time the opposite potentiometer has a relatively negative charge, it has no effect on the corresponding transistor and relay. Upon closing of one of the relay switches, a circuit is completed from a storage battery 31 to a solenoid actuated sleeve valve 32 or 33 which controls the flow of air or other brake actuating fluid, from a source of pressure not shown, through a line 34 which communicates with both of the valves. The valves 32 and 33 communicate through lines 35 and 36, respectively, with brake actuating cylinders 37 and 38.

It is apparent, through the circuits described, that when either of the wheels 17 or 18 rotates at a speed somewhat greater than the speed of the other wheel, the brake of the spinning wheel is automatically applied which simulates traction and imposes a load on the axle of the spinning wheel. Thus by reason of the differential connection between the axles, the opposite wheel is forced to drive and the wheel which has been spinning is retarded by the action of the brake to approximately the speed of the opposite wheel. The voltage output of the generators 22 will again be balanced removing the positive polarity from its potentiometer to effect deenergization of the corresponding relay 29 or 30 to permit closing of the valve controlled by the relay and release of the corresponding brake under influence of a spring 40 one of which is disposed in each of the brake actuating cylinders 37 and 38.

Each brake circuit includes a quick release valve 43 of conventional type, the function of which is to permit rapid exhaust of pressure from the brake cylinder when the brake control valve is closed. The brakes may also be actuated through conventional manual controls, not shown, through branch lines 41 which communicate with the cylinders on the down pressure side of the valves 32 and 33.

We claim:
1. A wheel slip control system comprising a pair of wheels driven through differential gearing, a brake for each wheel to apply braking force thereto upon actuation, electric current generating means driven by each wheel, means to sense the current output from said generating means, and means operable when the sensing means indicates that the output from one generating means exceeds the output from the other by a predetermined value to actuate the brake on the wheel which drives the generating means producing the greater output.

2. In a system for preventing either of two vehicle drive wheels connected by differential gearing from greatly exceeding the speed of the other, the combination comprising a pair of drive wheels connected by differential gearing, a pair of fluid actuated brakes for responsive engagement with said drive wheels, a valve controlling flow of fluid to actuate each brake, a tachometer generator driven by each wheel, a differential voltage detector connected with said generators and having separate output circuits corresponding to each wheel, a relay switch in each output circuit adapted to be closed by the circuit with the highest voltage, solenoid actuating means for each brake valve, and a pair of circuits respectively including the relay switch and solenoid means corresponding to the respective wheels to energize the solenoid means in response to the closing of the corresponding relay switches to effect actuation of the brake on the wheel turning at the greater speed.

3. A vehicular wheel slip control comprising two drive wheels connected by differential gearing, two fluid actuated brakes, one for each wheel, a valve controlling flow of fluid to actuate each brake, means driven by each wheel to generate an electric current with a value varying directly with the speed of the wheel, means to sense the current output from said generating means, electromagnetic means for actuating the brake valves, and means responsive to the current derived from the wheel turning at the greater speed to energize said electromagnetic means to actuate the valve to apply the brake on the wheel turning at the greater speed.

References Cited in the file of this patent
UNITED STATES PATENTS

| | | |
|---|---|---|
| 2,401,628 | Eksergian | June 4, 1946 |
| 2,511,793 | Telbizoff | June 13, 1950 |
| 2,583,307 | Schneider | Jan. 22, 1952 |
| 2,884,811 | Benno | May 5, 1959 |
| 2,937,051 | Highley | May 17, 1960 |